(12) United States Patent
Priescu et al.

(10) Patent No.: US 11,190,419 B1
(45) Date of Patent: Nov. 30, 2021

(54) TUNABLE-GRANULARITY MULTI-LEVEL HISTOGRAMS FOR EFFICIENT COMPUTER SYSTEM METRIC ANALYSIS

(71) Applicant: Amazon Technologies, Inc., Seattle, WA (US)

(72) Inventors: Valentin Gabriel Priescu, Seattle, WA (US); James Pinkerton, Sammamish, WA (US); Marc Stephen Olson, Bellevue, WA (US); Rajiv Satish Nair, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 969 days.

(21) Appl. No.: 15/604,597

(22) Filed: May 24, 2017

(51) Int. Cl.
| | | |
|---|---|---|
| G06F 11/00 | (2006.01) | |
| H04L 12/26 | (2006.01) | |
| G06F 11/34 | (2006.01) | |
| G06F 11/30 | (2006.01) | |
| H04L 12/24 | (2006.01) | |

(52) U.S. Cl.
CPC .......... *H04L 43/04* (2013.01); *G06F 11/3006* (2013.01); *G06F 11/3037* (2013.01); *G06F 11/3409* (2013.01); *G06F 11/3452* (2013.01); *H04L 41/5032* (2013.01); *H04L 41/5038* (2013.01); *H04L 43/50* (2013.01)

(58) Field of Classification Search
CPC ....... H04L 43/08; H04L 43/16; H04L 43/045; H04L 67/02; H04L 67/025; G06F 16/248; G06F 16/9038; G06F 2201/81; G06F 2201/86; G06F 2201/88; G06F 11/30; G06F 11/3089; G06F 11/323
See application file for complete search history.

(56) References Cited

U.S. PATENT DOCUMENTS

| | | | |
|---|---|---|---|
| 5,870,752 A * | 2/1999 | Gibbons | ............. G06F 16/2358 |
| 6,025,683 A | 2/2000 | Philipp | |
| 6,460,045 B1 * | 10/2002 | Aboulnaga | ......... G06F 16/2462 |
| 6,549,910 B1 | 4/2003 | Tate | |
| 7,889,923 B1 | 2/2011 | Carr et al. | |
| 8,024,458 B1 | 9/2011 | Buragohain | |
| 8,037,430 B2 | 10/2011 | Papanikolaou et al. | |
| 8,639,797 B1 * | 1/2014 | Pan | ........................ H04L 43/04 |
| | | | 709/224 |
| 9,218,382 B1 * | 12/2015 | Muntes | ................... G06F 17/40 |
| 9,697,316 B1 | 7/2017 | Taylor et al. | |
| 2004/0024801 A1 | 2/2004 | Hamilton et al. | |
| 2004/0064293 A1 * | 4/2004 | Hamilton | ............ G06F 11/3409 |
| | | | 702/182 |

(Continued)

OTHER PUBLICATIONS

Amazon Web Services, "Amazon CloudWatch User Guide", Dec. 2, 2010, Updated Mar. 8, 2017, pp. 1-194.

*Primary Examiner* — Augustine K. Obisesan
(74) *Attorney, Agent, or Firm* — Robert C. Kowert; Kowert, Hood, Munyon, Rankin & Goetzel, P.C.

(57) ABSTRACT

Memory is identified for a first set of histogram buckets for a metric with bucket value ranges distributed according to a first function, and a second set of histogram buckets with bucket value ranges distributed according to a second function. The second set of buckets overlaps with a metric value range targeted for enhanced granularity analysis. After the histogram is updated in response to obtaining metric values, a representation of at least some of the buckets is sent to a destination.

20 Claims, 10 Drawing Sheets

(56) References Cited

U.S. PATENT DOCUMENTS

| | | | |
|---|---|---|---|
| 2008/0167841 A1* | 7/2008 | Ramsey | G06F 17/18 703/2 |
| 2008/0320018 A1* | 12/2008 | Smith | G06F 16/2462 |
| 2009/0002370 A1* | 1/2009 | Helfman | G06T 5/009 345/440 |
| 2011/0145223 A1* | 6/2011 | Cormode | G06F 16/2462 707/722 |
| 2012/0102377 A1* | 4/2012 | Viswanathan | H03M 13/01 714/746 |
| 2015/0120856 A1* | 4/2015 | Bennett | H04L 41/145 709/213 |

* cited by examiner

| Level | Bucket upper bound | Count |
|---|---|---|
| 1 | 1 | 0 |
| 1 | 2 | 0 |
| 1 | 4 | 0 |
| 1 | 8 | 0 |
| 1 | 16 | 0 |
| 1 | 32 | 0 |
| 1 | 64 | 0 |
| 1 | 128 | 0 |
| 1 | 256 | 2 |
| 1 | 512 | 75 |
| 2 | 576 | 205 |
| 2 | 640 | 1991 |
| 2 | 704 | 523 |
| 2 | 768 | 1302 |
| 2 | 832 | 1984 |
| 2 | 896 | 495 |
| 2 | 960 | 1083 |
| 2 | 1024 | 526 |
| 2 | 1152 | 1028 |
| 2 | 1280 | 430 |
| 2 | 1408 | 310 |
| 2 | 1536 | 1180 |
| 2 | 1664 | 1430 |
| 2 | 1792 | 705 |
| 2 | 1920 | 1519 |
| 2 | 2048 | 378 |
| 1 | 4096 | 8 |

| Level | Bucket upper bound | Count |
|---|---|---|
| 1 | 8192 | 24 |
| 2 | 8704 | 1748 |
| 2 | 9216 | 873 |
| 2 | 9216 | 139 |
| 3 | 9344 | 2374 |
| 3 | 9472 | 1752 |
| 3 | 9600 | 2529 |
| 3 | 9728 | 1890 |
| 3 | 9856 | 4637 |
| 3 | 9984 | 2685 |
| 3 | 10112 | 2325 |
| 3 | 10240 | 3019 |
| 2 | 10752 | 208 |
| 2 | 11264 | 1036 |
| 2 | 11776 | 1201 |
| 2 | 12288 | 1465 |
| 2 | 12800 | 381 |
| 2 | 13312 | 746 |
| 2 | 13824 | 1677 |
| 2 | 14336 | 448 |
| 2 | 14848 | 607 |
| 2 | 15360 | 999 |
| 2 | 15872 | 962 |
| 2 | 16384 | 610 |
| 1 | 32768 | 228 |
| 1 | 65536 | 65 |
| 1 | 131072 | 0 |
| 1 | 262144 | 3 |
| 1 | 524288 | 2 |
| 1 | 1048576 | 0 |

Multi-level histogram 305

TUNABLE-GRANULARITY MULTI-LEVEL HISTOGRAMS FOR EFFICIENT COMPUTER SYSTEM METRIC ANALYSIS

BACKGROUND

Network-accessible services and systems have become widely available in recent years. The resources used for a network-accessible service are typically geographically and logically separate from the clients subscribing to the service. Network-accessible services may include computing devices configured to provide storage resources (e.g., virtual disk drives, cloud storage devices) and/or virtual computing resources (e.g., virtual machines). At network-accessible services, the performance of various components in the system may be analyzed to determine client usage profiles, peak usage times or latency between various points of the system, for example. To analyze performance, monitors may be implemented at multiple points in the network-accessible service to continuously monitor various performance metrics (e.g., CPU utilization, latency to respond to requests, available storage, etc.) The continuous stream of performance data may be further aggregated to report the results of the monitoring.

As an example, clients of a network-accessible service may store (put) data to and retrieve (get) data to or from the virtual and/or physical storage devices exposed by the service. A localized resource (e.g., a host computer) of the service may monitor the latency for the puts and gets over time. The performance data generated by the monitoring may be used to analyze network and/or service performance, to debug apparent problematic or unexpected behavior, and so on. In addition, the monitored data may be stored and/or post-processed for further analysis.

As the number of clients, the amount of performance data, and/or the number of performance metrics monitored grows, significant storage resources may be required to store the monitored data and the post-processed data, and significant computing resources may be required to process the monitored data. As a result, service administrators may implement various data sampling techniques to reduce the amount of monitored data stored and analyzed. In many cases, values of at least some metrics may vary over several orders of magnitude, and the extent of the variation may itself change over time. Furthermore, metric value variation may also differ from one instance of a resource to another, and some ranges of metrics may be of greater interest at some points of time than others. These complexities may make accurate reporting of performance metrics without excessive overhead a non-trivial technical challenge.

Figure 1:
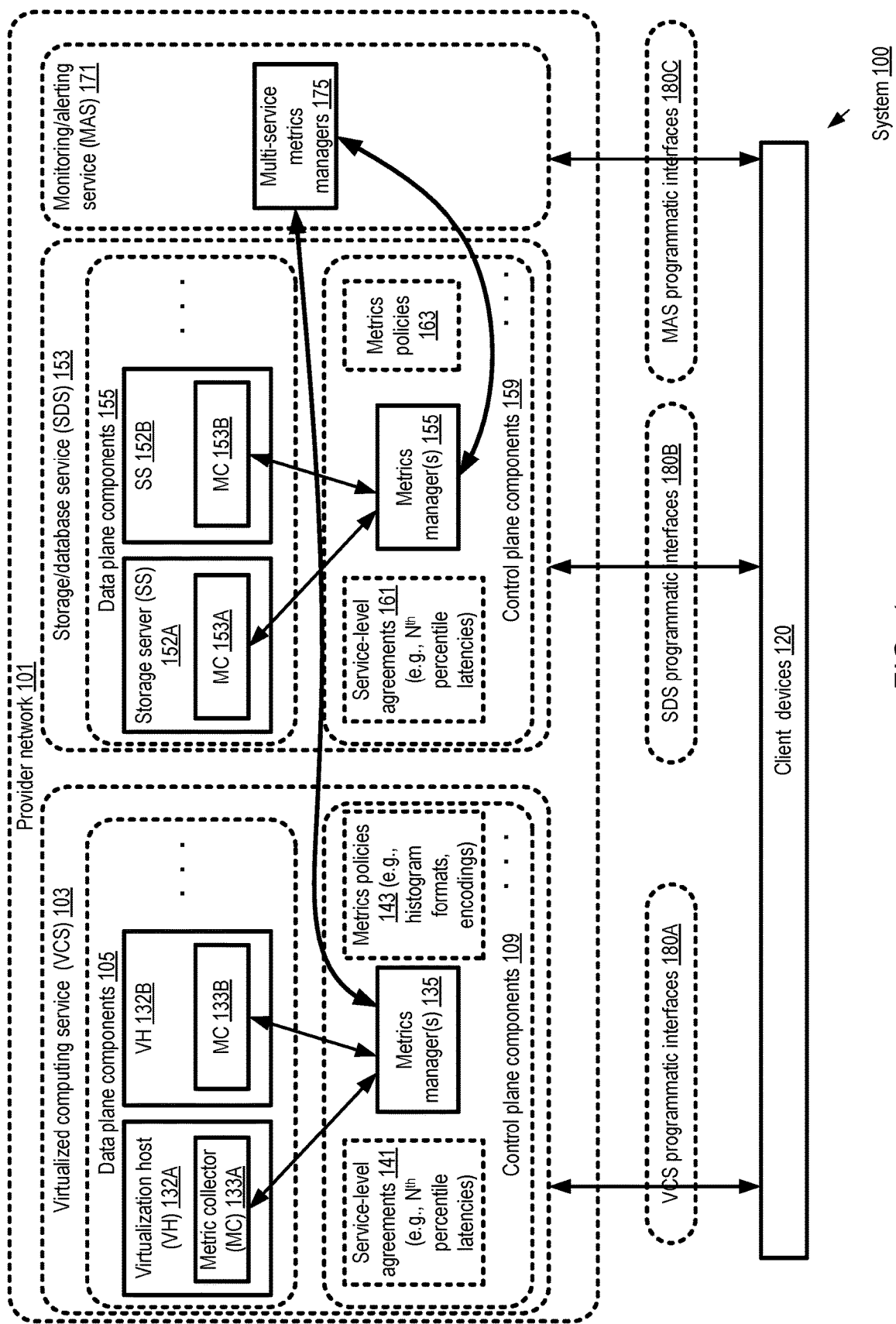
FIG. 1 illustrates an example system environment in which tunable multi-level histograms may be used for metrics collection and analysis, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for implementing tunable-granularity histograms for collecting and analyzing metrics of computing environments at desired levels of granularity are described. According to one embodiment, a system may comprise a plurality of metrics collectors and at least one metrics manager. The metrics collectors and/or the metrics manager may comprise, or be implemented at, one or more computing devices. Individual metrics collectors may, for example, comprise executable instructions for capturing and storing a variety of metrics associated with different resources of a computing environment, such as various types of latency metrics, utilization metrics, throughput metrics, error metrics and the like collectable from different levels of a hardware and/or software stack. The metrics managers may be responsible for orchestrating the collection of the metrics by the collectors (e.g., by choosing and/or changing various types of configuration settings), aggregating metrics, responding to queries from metrics consumers, and so on in various embodiments.

The ranges over which values of a given metric may be expected to vary may be quite large in some embodiments—e.g., with respect to latencies for certain types of data transfers, the range may vary from a few microseconds to millions of microseconds, depending on various factors such as the size of the transfer, the types of the source and destination device, the network distance over which the data has to be transferred, and so on. Thus, in at least some embodiments, the metrics collection and analysis system may have to manage metrics value ranges comprising several orders of magnitude. Furthermore, in at least some embodiments and for certain use cases, particular sub-ranges of the overall metric value range may require more fine-grained analysis than other sub-ranges. In one embodiment, for example, a storage service may implement a service level agreement in which clients are provided assurances regarding particular percentiles of response times or latencies—e.g., a client may expect that at least 90% of the response times for reads of less than K kilobytes will be satisfied within N milliseconds under most operating conditions. In such a scenario, the distribution of read response times in the vicinity of N milliseconds may be of greater interest, for example, than the distribution of the read response times in the vicinity of N/10 milliseconds or 2*N milliseconds.

In various embodiments, histograms may be used to capture metrics value distribution information by the metrics collectors and the metrics managers. A metrics collector may be responsible for at least two levels of data collection in some embodiments: a default level, which broadly captures the distribution of metric value samples over a potentially wide range (e.g., orders of magnitude) of expected values, and one or more ranges for which distribution information at an enhanced-resolution granularity is desired. Furthermore, in at least some embodiments, one or both levels of data collection may be dynamically configurable—that is, the value ranges for which fine-grained data collection is desired may change over time, the granularity at which enhanced-resolution data collection is desired may change over time, and/or the overall range of expected values may change over time. Respective sets of histogram buckets may be used to accomplish the multi-level data collection in various embodiments. A given set of buckets used for collecting metrics sample values with bucket value ranges selected according to a particular function, may be referred to collectively as a "bucket level", and the overall histogram for a given metric may thus comprise a combination of buckets at one or more levels. In one embodiment, histogram buckets used for capturing metrics values at the lowest resolution according to a first function for determining bucket boundaries may be referred to as "Level-1" or "L1" buckets, those used for capturing values at the next higher resolution using a second function for bucket boundaries may be referred to as "L2" buckets, and so on, as discussed below in further detail. The default bucket widths or boundaries of an L1 bucket set may be distributed according to an exponential function in some embodiments so as to broadly capture the metrics variation over very large ranges—e.g., respective L1 bucket widths for the read response time example scenario discussed above may comprise [<1 millisecond], [1-2 milliseconds], [2-4 milliseconds], [4-8 milliseconds], and so on up to some large bucket width corresponding to the highest response times.

In at least some embodiments, a given metrics collector may obtain an indication (e.g., from a metrics manager) of an enhanced-resolution granularity for capturing metric value sample distribution data corresponding to one or more targeted value ranges of a particular metric associated with a resource. For example, in the example scenario regarding read latencies discussed above, an enhanced-resolution granularity of, say, 2 milliseconds may be indicated for capturing response time distribution data corresponding a target value range of (N−10) to (N+10) milliseconds. In some embodiments, in addition to the default L1 buckets, ten L2 buckets with bucket widths of 2 milliseconds each may be set up by the metrics collector (e.g., respective buckets for [N−10] to [N−8] milliseconds, [N−8] to [N−6] milliseconds, [N−6] to [N−4] milliseconds, [N−4] to [N−2] milliseconds, [N−2] to [N] milliseconds, [N] to [N+2] milliseconds, [N+2] to [N+4] milliseconds, [N+4] to [N+6] milliseconds, [N+6] to [N+8] milliseconds, and [N+8] to [N+10] milliseconds). In this example scenario, the bucket widths at the L2 level may be distributed according to a linear function, rather than an exponential function which may be used for L1 buckets to capture the wide overall range of expected sample values. In some embodiments, distributions other than exponential or linear may be used for bucket widths at various levels, and the configurations of the buckets at the different levels may be selected (for example by the metrics managers) based on various factors such as the service level agreements associated with the collected metrics, the amount of memory available for histograms at the collectors, and so on.

Information about the enhanced-resolution granularities and the targeted value ranges for which the enhanced-resolution distribution information is desired, as well as information about the overall range of metric values may be used to allocate memory for histogram buckets in various embodiments. In some embodiments, a region of a memory may be pre-allocated for a given histogram, e.g., during startup or initialization of a metrics collector, and the specific portions of the region which are to be used for various individual buckets may be identified dynamically based on histogram configuration or re-configuration requests. In at least some embodiments, the total amount of memory available for histograms may be quite small—e.g., if the metrics are being collected at a constrained-memory device such as a peripheral device, an Internet-of-Things (IoT) device or the like. Respective portions of memory may be identified or allocated to store data associated with a plurality of first-level buckets of a first histogram of values of the metric and at least a first set of second-level buckets of the first histogram in some embodiments. As mentioned above, respective value ranges of at least some of the first-level buckets may be distributed according to an exponential function in some embodiments, while respective value ranges of at least some of the second-level buckets may be distributed according to a non-exponential (e.g., linear) function. Respective value ranges of at least some second-level buckets of the first set may overlap at least in part with the targeted value ranges in various embodiments. In effect, the indication of the targeted value ranges and the corresponding enhanced-granularity resolutions may represent a "zoom-in" capability with respect to metrics value distributions in such embodiments, using which desired ranges of value metrics may be analyzed at desired levels of detail. It is noted that multi-level histograms of the kind described above may not always be required for every metric at every agent in some embodiments—e.g., by default, only a histogram with L1 buckets may be established, with L2 or other higher levels of buckets being set up as and when needed.

After space for the histogram buckets corresponding to a given single-level or multi-level bucket configuration has been allocated or identified, in various embodiments, in response to obtaining a sample value of the first metric, at least one bucket of the histogram to whose value range the sample value belongs may be updated by the metrics collector. It is noted that in at least one embodiment, the bucket width of a bucket at a level Li may overlap with the bucket width of another bucket at level Lj, so in some cases multiple buckets may be updated in response to capturing a single sample metric value. In different embodiments, a report comprising a representation of the histogram may be generated at the metrics collector periodically or in response to a request, and the report may be provided or transmitted to a metrics manager for summarization and/or analysis. The metrics manager may in turn collect reports from numerous different metrics collectors in some embodiments, generate an aggregate representation of the distribution of values of a given metric obtained from the different metrics collectors, and provide the aggregate representation to one or more metrics consumers. Metrics managers may also be referred to as metrics aggregators in some embodiments.

In at least one embodiment, the histogram configuration in use for a given metric at one or more metric collectors may be modified dynamically, e.g., at the request of a metrics manager. For example, in response to receiving a configuration request comprising an indication of a new targeted value range of a first metric, an additional set of second-level buckets may be added to a histogram at a metrics collector, such that value ranges of at least some second-level buckets of the second set overlap at least in part with the new targeted value range. In a constrained-memory environment which may exist at some types of metrics collectors in some embodiments, it may not always be possible to add new buckets to a histogram without freeing up some of the memory that was previously in use for other buckets. Accordingly, in some embodiments, some number of pre-existing buckets corresponding to the earlier histogram configuration may be consolidated into a single bucket (or simply discarded/removed) if a determination is made that adding new buckets would result in a memory threshold being exceeded.

In some embodiments, a metrics manager may collect and aggregate metrics associated with a particular resource type from numerous metrics collectors. For example, in one embodiment a customer of a network-accessible computing service may have P different virtual machines instantiated, and statistics regarding latencies of I/O operations may be obtained from metrics collectors installed at each of the P different virtual machines by a single metrics manager. In some cases, the respective histogram configurations of different metrics collectors for which an aggregate representation of metrics is to be generated may differ—e.g., the L2 bucket boundaries at a particular virtual machine may differ from at least some bucket L2 bucket boundaries at a different virtual machine in the above example. In order to combine the metrics from such differently-configured histograms into an overall aggregate histogram, in some embodiments a metrics manager may have to define buckets whose boundaries do not match exactly with the bucket boundaries of at least some histograms reported by the metrics collectors. For example, consider a trivial example scenario in which set of buckets B1 reported by a first metrics collector MC1 has bucket boundaries {[0-10], [10-20], [20-22], [22-24], [24-26], [26-28], [28-30], [30-40]}, while another set of buckets B2 reported by a different metrics collector MC2 for the same metric has bucket boundaries {[0-10], [10-15], [15-20], [20-25], [25-30], [30-33], [34-37], [38-40]}. In this scenario, when aggregating the histograms from MC1 and MC2, the metrics aggregator or manager may, for example, set bucket boundaries of an aggregate histogram to 1[0-10], [10-20], [20-30], [30-40}, which differ from the bucket boundaries of both MC1 and MC2. In at least some embodiments, a metrics aggregator may retain the fine-grained bucket information obtained from different collectors for at least some retention period, even if the overall aggregated histogram ends combining the original buckets into wider-granularity buckets for summarization purposes. In such a scenario, the retained fine-grained bucket data may be provided, for example, in response to requests from analysts or other metrics consumers.

In some embodiments, one or more optimization techniques may be used to make the computations associated with metrics collection and analysis more efficient, e.g., at the metrics collectors and/or the metrics managers. For example, in one embodiment, bucket boundaries may be set at powers of two, which may enable at least some computations to be performed using bit masks or bit shift operations, without requiring more complicated arithmetic operations such as floating point operations. If bucket boundaries are set to powers of two, it may be possible in one embodiment to apply a bit mask to a metric value to very quickly identify the particular histogram bucket or buckets to be updated to reflect the metric value. In some embodiments, bit masks may also be used to indicate the particular L1 buckets for which finer-granularity L2 buckets are to be set up—e.g., a configuration request from a metrics manager may include such a bit mask to indicate a target value range for high-resolution data collection. In at least one embodiment, a given histogram may be set up to capture negative values (e.g., for capturing variations of a metric's value around a mean or median value) as well as or instead of positive values. In some embodiments, more than two levels of buckets may be set up for a given metric—e.g., one or more L1 bucket value ranges may be subdivided into respective sets of L2 buckets, an L2 bucket's value range may be subdivided into a set of L3 buckets, and so on. In at least one embodiments, machine learning algorithms may be employed to identify histogram configurations which are more likely over time to yield the most useful information for various use cases and metric types.

In one embodiment, the multi-level histogram technique discussed above may be applied at various services of a provider network environment. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries). In one embodiment, a provider network may include a monitoring and alerting service, which may be used by clients of other services (such as a storage service or a virtualized computing service) to obtain statistics and/or notifications about performance and events at resources of the other services. Such a monitoring and alerting service may utilize metrics collectors or agents distributed among the resources of other services in some embodiments. Multi-level tunable histograms of the kind discussed above may be especially useful for such a monitoring and alerting service, as it may be responsible for capturing and providing statistics for metrics whose values vary over extremely wide ranges, often with several sub-ranges for which finer granularity distribution data may be desirable.

Example System Environment

FIG. 1 illustrates an example system environment in which tunable multi-level histograms may be used for metrics collection and analysis, according to at least some embodiments. As shown, system 100 may comprise resources of several network-accessible services of a provider network 101, including for example a virtualized computing service (VCS) 103, a storage or database service (SDS) 153 and a monitoring and alerting service (MAS) 171. VCS 103 and SDS 153 may each comprise a respective set of data plane components (e.g., data plane components 105 of the VCS and data plane components 155 of the SDS) and control plane components (e.g., control plane components 109 of the VCS and control plane components 159 of the SDS) in the depicted embodiment. Control-plane components may be responsible primarily for configuration operations and other administrative tasks associated with the service, while data plane components may be used primarily to perform computations on and store/transmit customer data in various embodiments. The VCS 103 and the SDS 153 may each establish respective service-level agreements (SLAs) with their clients in the depicted embodiment, such as SLAs 141 and 161 defining Nth percentile latencies and other performance targets for various types of service operations.

For a number of reasons, including for example the need to be able to verify the extent to which the SLA performance goals are being met, various types of performance-related and/or error-related metrics may be collected at data plane devices of the VCS 103 and the SDS 153 in the depicted embodiment. In the case of the VCS 103, virtual machines may be instantiated on behalf of one or more VCS clients at various virtualization hosts, such as virtualization hosts 132A and 132B of the VCS data plane. Metrics associated with the virtual machines, or with applications deployed on the virtual machines, such as response times or latencies for various types of web service requests, I/O operations, error rates and the like may be collected by respective metrics collectors (MCs) 133 at the virtualization hosts, including MC 133A at virtualization host 132A and MC 133B at virtualization host 132B. At the SDS 153, data plane components 155 may comprise a number of storage servers 152 such as storage servers 152A and 152B in the depicted embodiment. A number of performance and/or error-related metrics may be collected by respective MCs 153 at or from the storage servers 152—e.g., MC 153A at storage server 152A and MV 153B at storage server 152B.

In the depicted embodiment, metrics configuration settings and aggregation may be handled at metrics managers of at least two kinds—service-level metrics managers 135 and 155 at the VCS and the SDS respectively, and multi-service metrics managers 175 of the monitoring and alerting service 171. Individual network-accessible services such as the VCS 103 and the SDS 153 may enforce service-specific metrics policies (such as policies 143 and 163 of the VCS and the SDS respectively), governing for example the formats in which metrics configuration requests are communicated, the formats in which metrics data such as histogram bucket information is communicated, the metrics reporting protocol (e.g., how frequently metrics are sent from the MCs to the metrics managers and at whose initiative), and so on. The multi-service metrics managers 175 of the monitoring and alerting service may communicate with the service-level metrics managers 135 and 155, obtaining configuration information and aggregated metrics from various services to provide metrics views and perspectives which may at least in principle span different services. In some embodiments, the metrics managers 175 of the MAS 171 may also communicate directly with metrics collectors in the data planes of other services such as the VCS 103 and/or the SDS 153. In one embodiment, the MAS may establish its own fleet of metrics collector agents at various devices of other services. In at least one embodiment, metrics policies (including histogram configuration change policies) may be enforced by the MAS 171 for one or more other services such as the VCS 103 or the SDS 153, and service-specific metrics managers may not be required.

In the depicted embodiment, various network-accessible services of the provider network 101, including the VCS 103, the SDS 153 and the MAS 171 may implement a respective set of programmatic interfaces, such as VCS programmatic interfaces 180A, SDS programmatic interfaces 180B, and MAS programmatic interfaces 180C. A variety of programmatic interfaces 180 may be exposed by a given service in some embodiments, such as for example, a web-based console, application programming interfaces (APIs), command-line tools, graphical user interfaces and the like. The programmatic interfaces 180 may be used to submit requests from client devices 120 for various types of service resources and/or for metrics information pertaining to resources and applications in the depicted embodiment, and to receive response to such requests. For example, a client of the VCS may request some number of virtual machines to be established on the client's behalf using programmatic interfaces 180A, and later request statistical summaries or details regarding metrics collected on operations performed at those virtual machines using the programmatic interfaces 180A and/or 180C. Similarly, a client may submit requests for storage space or database objects using programmatic interfaces 180B, and request statistical summaries of metrics collected from the storage or database objects using programmatic interfaces 180B or 180C in the depicted embodiment. In some embodiments, the programmatic interfaces 180 may be used to define various metrics to be collected and/or to specify one or more properties of metrics policies 143 or 163—e.g., a client of the SDS 153 may request that metrics be collected separately for reads of size less than 4 kilobytes and for reads of size more than 4 kilobytes. The MAS 171 may also transmit alerts (whose triggering conditions may at least in some cases have been indicated via the programmatic interfaces 180C) to various client devices 120, e.g., when a particular metric exceeds or falls below a specified threshold for some time interval, via the programmatic interfaces 180C in the depicted embodiment. A client device 120 may, for example, comprise any computing device (such as a laptop or desktop computer or host, a tablet computer, a smart phone or the like) from which programmatic interfaces 180 may be utilized or invoked in various embodiments. Client devices 120 which are used for obtaining statistical information from metrics managers regarding various types of service metrics may represent one example of metric consumers or metric destinations.

In various embodiments, metrics managers at the VCS 103, the SDS 153 and/or the MAS 171 may be responsible for informing or instructing the metrics collectors 133 and 153 regarding details of the manner in which metrics are to be organized and reported back to the metrics managers in accordance with the applicable policies 143 or 163. For example, in one embodiment, the full range of values expected for a given type of metric to be collected with respect to a particular resource or operation type may be provided to MCs 133 and 153 by metrics managers 135 and 155 respectively, together with a function defining histogram bucket value ranges for that metric. In addition, in at least one embodiment, an indication of an enhanced-resolution granularity for capturing metric value distribution data corresponding to one or more targeted value ranges of the metric, and./or functions to be used to determine bucket values for those targeted value ranges, may be provided to MCs 133 and 153. Additional metadata regarding histograms, such as the amount of memory to be used per bucket, the details of the data to be stored in each bucket (e.g., whether only the count of metrics that fall within the bucket's value range is to be stored, or whether additional statistics such as intra-bucket maxima or minima are also to be retained), the triggering conditions for sending histogram reports, the formats of the reports, etc., may also be provided in some embodiments to the MCs. The MCs may allocate or identify respective sets of histogram buckets for each of the levels for which guidance is received from the metrics managers in the depicted embodiment, and start populating the buckets as metric values are captured at the data plane devices.

Eventually, in accordance with the reporting requirements indicated by the metrics managers, representations of at least some of the histogram buckets (e.g., in compressed form) may be transmitted back to the metrics managers in various embodiments. In at least some embodiments, a pull model for histogram data may be used, in which the histogram representations are obtained at the metrics managers in response to explicit commands or requests sent to the MCs; in other embodiments, a push model may be used in which the MCs transmit the histogram recommendations without receiving specific commands or requests to do so, or a hybrid push/pull model may be used in which either side may initiate the transfer. In at least some embodiments, the histogram buckets may be updated fairly rapidly at the metrics collectors—e.g., at the rate of thousands of updates per second. In order to avoid interfering with metrics collection, in at least some embodiments exclusive locks may not be required on the histograms or on individual buckets prior to transmitting the histogram's values or bucket values to metrics managers, and as a result the bucket counts or populations received at the metrics managers may not necessarily be fully synchronized or fully consistent at a given point of time. The metrics managers may aggregate the data collected from various MCs and provide the aggregated results to one or more destinations (such as client devices 120, and/or repositories for the various services). In at least one embodiment, metrics managers 175 of the MAS 171 may also collect metric histograms or summarized versions of the histograms from various other services (e.g., either from MCs or from service-specific metrics managers), aggregate the collected data and provide the results to MAS clients. In one embodiment, collected metrics may be analyzed at one or more levels—e.g., at the MCs themselves, at service-specific metrics managers, or at MAS metrics managers—to determine whether any triggering conditions for alerting service clients or administrators have been met. If such triggering conditions are met, one or more alerts may be generated and provided via any of various notification mechanisms such as electronic mail, text messages, and the like.

In at least some embodiments, histogram configurations (e.g., the number of buckets at various levels, the widths of the buckets at different levels) may be dynamically modified. For example, consider a scenario in which a performance-related bug is to be resolved, and the bug appears to manifest itself most often in the context of read operations of sizes in the approximate range 900 bytes to 1200 bytes. Assume further than the widths of L1 (level 1) buckets of a histogram for read response times are arranged according to an exponential function, so L1 bucket boundaries include [512-1024 bytes] and [1024-2048] bytes. In order to focus in on the problem associated with reads of sizes 900-1200 bytes, L2 (level 2) buckets in the range 784-1344 bytes with widths of 64 bytes each may be set up in one embodiment, so that more details can be obtained regarding the performance of reads in the range of interest. Later, that set of L2 buckets may be discarded as needed. In some embodiments, only a small amount of memory may be available for histogram buckets at the MCs, so some existing histogram buckets may be combined before adding new buckets as discussed below in further detail. In at least some embodiments, e.g., in order to simplify computations, powers of two may be used at least in some cases for bucket widths. As a result of selecting bucket widths intelligently, bit masking operations and bit shifting operations may be sufficient for most of the computations required for mapping metric values to buckets, summarizing or indicating the configuration of histogram structure, and so on in such embodiments. Several levels of buckets may be included in a given histogram in some embodiments, e.g., to obtain metrics distribution statistics at several different granularities for various ranges of interest. The metrics value ranges for which fine-grained information is obtained may be selected by metrics managers based at least in part on parameters of SLAs (such as SLAs 141 and 161) in various embodiments—e.g., if 99% of response times for a particular operation type are to be within T milliseconds, response time ranges in range centered at or around T may be selected for high granularity reporting.

Zoomed-in Metrics Value Ranges

Figure 2:
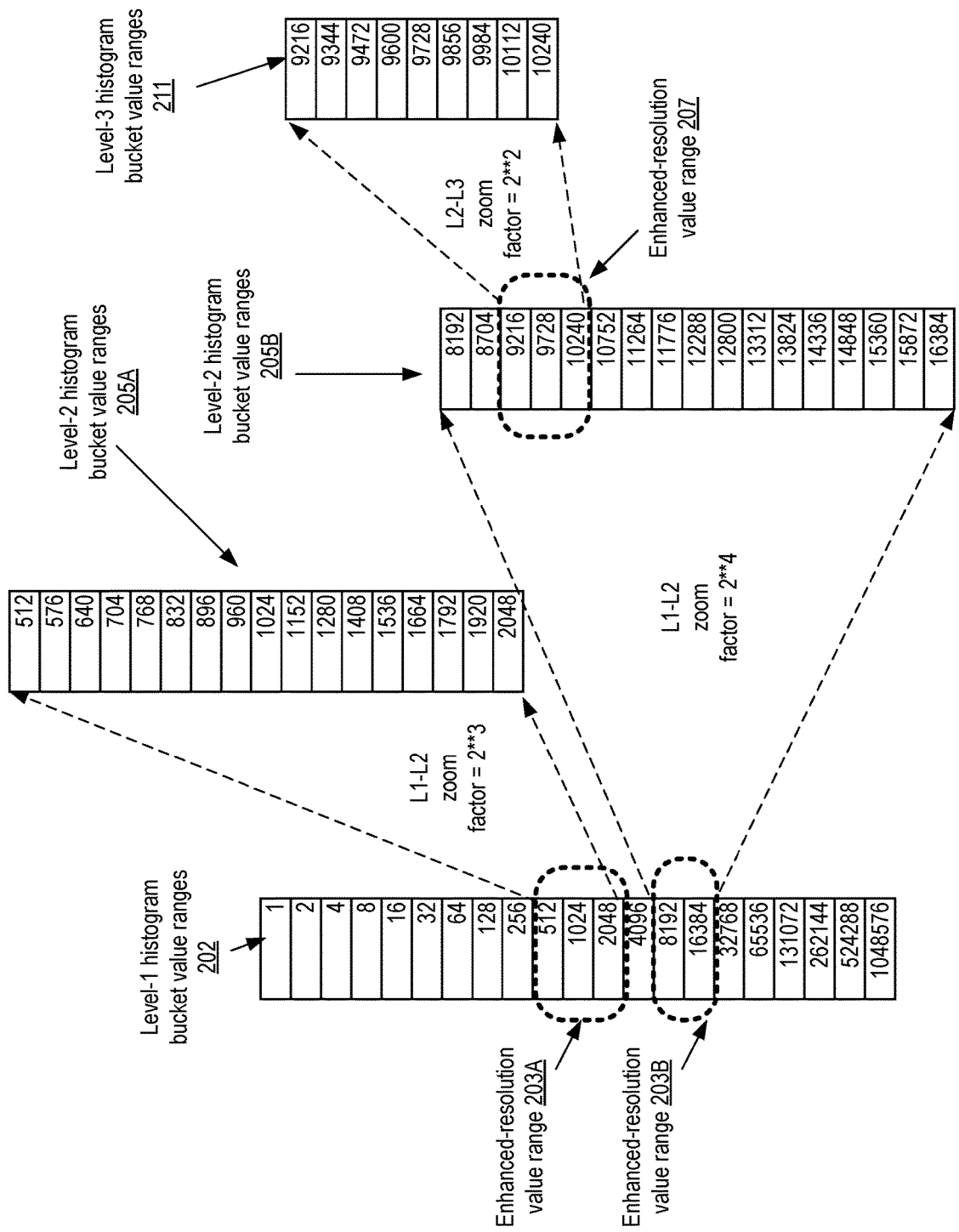
FIG. 2 illustrates examples of enhanced-resolution metrics value ranges for which multi-level histograms may be used, according to at least some embodiments.

FIG. 2 illustrates examples of enhanced-resolution metrics value ranges for which multi-level histograms may be used, according to at least some embodiments. In the depicted embodiment, a baseline set of level-1 bucket value ranges 202 for a particular metric are distributed according to a (binary) exponential distribution, with metric values expected to lie in the range 1-1048576. The values shown in the buckets 202 represent the non-inclusive upper bounds of the values for which counters or other statistics may be maintained in the histogram, with the lower bounds being defined by the upper bounds of the adjacent bucket—e.g., the first bucket (shown with label "1") may be used for countering occurrences of metric values 0, the second bucket (with label "2") may be used for occurrences of metric value 1, the third bucket (with label "4") may be used for occurrences of metric values 2 and 3, and so on.

Among the level-1 (L1) bucket value ranges 202, two sets of adjacent bucket ranges may have been selected (e.g., based on SLA parameters) for analysis at greater detail: enhanced-resolution value range 203A of metric values between 512 and 2048, and enhanced-resolution value range 203B of metric values between 8192 and 16384. In the case of L1 range 203A, an L1-to-L2 zoom factor of 23 (i.e., 8) is desired; that is, the two L1 buckets [512-1024] and [1024-2048] may be expanded to or replaced by 8 buckets each, making a total of 16 L2 buckets 205A. In the case of L1 range 203B, an L1-to-L2 zoom factor of 24 (i.e., 16) is desired, so the L1 bucket with range [8192-16384] is split into 16 smaller L2 buckets 205B. As indicated by the labels shown for ranges 205A and 205B, individual L1 bucket ranges have been split into L2 buckets according to a linear function in the depicted embodiment—e.g., the range 512 to 1024 has been split into 8 buckets of size 64, and the range 1024 to 2048 has been split into 8 buckets of size 128. The split may not necessarily be linear in at least some embodiments.

In at least one embodiment, more than two levels of buckets may be used. For example, an enhanced-resolution value range of between 9216 and 10240 may be identified in the L2 buckets 205B, and a set of level-3 (L3) buckets with an additional L2-to-L3 zoom factor of 4 may be created in the depicted embodiment, with value ranges 211. Using the multi-level approach, any desired granularity may be achieved for histogram buckets in various embodiments, with the caveat that the total number of buckets that can be used may be limited by memory constraints at the metrics collector. In some embodiments, when a value range higher level bucket (such as an L1 bucket) is to be split up, the higher-level buckets may be replaced by the combination of the lower-level buckets (as in the example shown on FIG. 3)—that is, the histogram may not contain any overlapping buckets. In other embodiments, complete contiguous sets of buckets may be maintained at each level—e.g., the L2 buckets 205A and 205B may be used in addition to their "parent" L1 buckets. In the latter scenario, multiple buckets may be updated as a result of a single new metric value being captured—e.g., if a metric value of 864 is obtained at a metrics collector in the example scenario of FIG. 2, the L1 bucket labeled 1024 may be updated, as well as the L2 bucket labeled 896.

Figure 3:
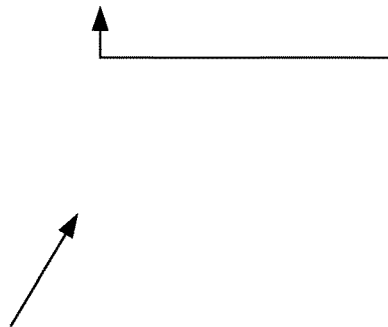
FIG. 3 illustrates an example of a multi-level histogram, according to at least some embodiments.

FIG. 3 illustrates an example of a multi-level histogram, according to at least some embodiments. Multi-level histogram 305 comprises buckets at three granularity levels in the depicted embodiment. For any given bucket, its level (1, 2, or 3, in order of increasingly fine granularity) is shown in the first column of the table shown in FIG. 3, the upper bound for metric values is indicated in the middle column, and the count of metric value instances or examples is shown in the third column.

In the example shown in FIG. 3, level 1 bucket value ranges are distributed according to an exponential function, while value ranges for level 2 and level 3 buckets are distributed according to linear functions. The value ranges for which enhanced resolution information is stored using histogram 305 include [512-2048] (which is divided into sixteen level 2 buckets instead of two level 1 buckets) and [8192-16384] (which is divided into 15 level 2 buckets and 8 level 3 buckets instead of a single level 1 bucket). The region for which the greatest level of detail regarding metric value distributions is desired corresponds to [9216-10240], for which level 3 bucket widths of 128 have been selected. As indicated by the bucket labels, histogram 305 is arranged in such a way that a given metric value is mapped to a single bucket in the depicted embodiment—that is, there is no overlap in the value ranges of buckets at different levels. As mentioned earlier, in some embodiments, instead of replacing a given level j bucket with some number of narrower level (j+1) buckets, the complete set of level j buckets may be retained and addition level (j+1) buckets may be added, thereby resulting in multiple bucket updates if metric values in the overlapping ranges for the different levels are encountered.

Metrics Configuration and Reporting Interactions

Figure 4:
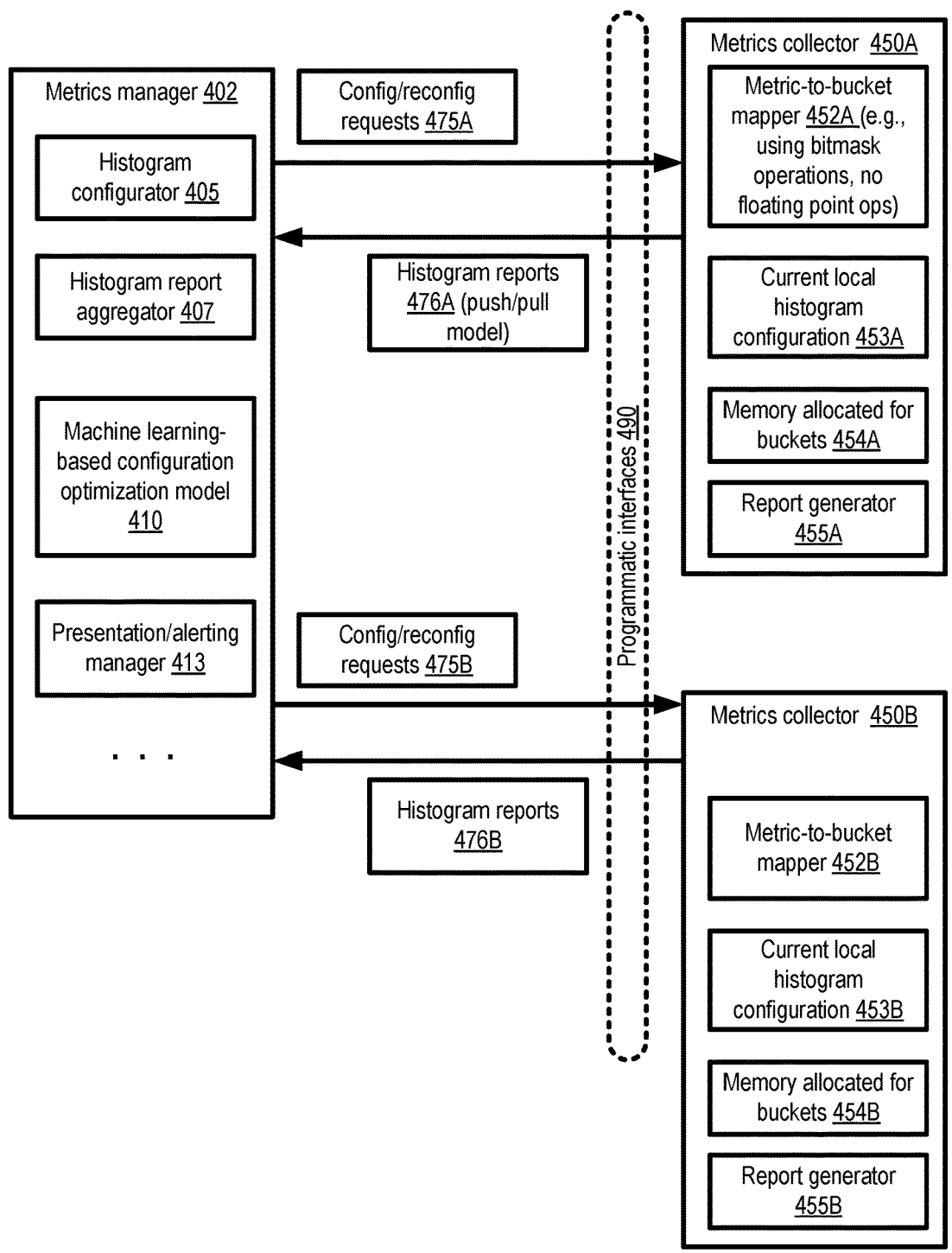
FIG. 4 illustrates example interactions between a metrics manager and metrics collectors, according to at least some embodiments.

FIG. 4 illustrates example interactions between a metrics manager and metrics collectors, according to at least some embodiments. As shown, metrics manager 402 may comprise, among other components, a histogram configurator 405, a histogram report aggregator 407, a machine learning based configuration optimization model 410, and a presentation/alerting manager 413 in the depicted embodiment. Metrics manager 402 may interact with a plurality of metrics collectors 450, such as metrics collectors 450A and 450B in some embodiments. A given metrics collector 450 may comprise, for example, a metric-to-bucket mapper 452 (e.g., mappers 452A or 452B), a current local histogram configuration 453 (e.g., 453A or 453B), a local portion 454 (e.g., 454A or 454B) of memory allocated for histogram buckets, and a report generator 455 (e.g., 455A or 455B) in at least some embodiments.

The metrics manager 402 may transmit histogram configuration or reconfiguration requests 475 (e.g., 475A or 475B) to the metrics collectors 450 via programmatic interfaces 490 in the depicted embodiment, and obtain histogram reports 476 (e.g., 476A or 476B) at various points of time from the metrics collectors 450. A given configuration request 475 may indicate, for example, the number of histogram buckets of one or more levels to be set up at the metrics collector, value ranges of the buckets at the various levels, the number of bits to be used to store metric counts in the buckets, the types of additional information (e.g., per-bucket minima or maxima) to be stored with respect to the buckets, and so on in various embodiments. The histogram configurator 405 may set parameters for the histograms based on a variety of factors in different embodiments, such as for example an estimate of the expected range of the metric values which are going to be collected (which may in turn be based on an analysis of earlier-collected metrics), values of various SLA settings (such as targeted $90^{th}$ percentile or $99^{th}$ percentile latencies) associated with the metrics, debugging requirements, reporting preferences of clients on whose behalf the metrics are being collected, and so on. In at least one embodiment, a machine learning model 410 may be used to adjust histogram parameters over time—e.g., the distribution of metrics collected over some time period may be analyzed by such a model together with queries regarding the collected metrics and the manner in which memory is mapped to buckets at the metrics collectors to determine whether a more useful or efficient histogram configuration is possible. If and when an optimization adjustment to the configuration is identified, a reconfiguration request may be sent to the metrics collector(s) 450 in the depicted embodiment. The histogram report aggregator 407 may combine histogram data received from various metrics collectors (whose local histogram configurations may not necessarily be identical) and provide an aggregated representation to the presentation/alerting manager 413 in the depicted embodiment, which may in turn pass on the aggregated representation to one or more destinations such as a client of the service where the metrics are being collected. If the histogram bucket boundaries of different metrics collectors are not identical or consistent with one another, as discussed earlier, the report aggregator 407 may combine counts and/or other statistical measures of several buckets during the aggregation procedure—that is, the bucket boundaries of an aggregated histogram may in some cases differ from the bucket boundaries of the histograms reported by one or more of the metrics collectors 450.

The metric-to-bucket mappers 452 may implement the logic for identifying which bucket (or buckets) should be updated when a particular metric value is collected in the depicted embodiment. In some embodiments, the histogram buckets may be organized such that the bucket boundaries are powers of two, or are sums of powers or two, so the logic for mapping metric values to buckets may be able to use efficient bit mask operations or bit shift operators, and more complex operations such as floating point arithmetic operations may not be required.

Histogram reports 476 may be transmitted according to a push model in some embodiments, in which the metrics collector 405 initiates the transfer of the reports. In other embodiments, a pull model (in which the metrics manager 402 initiates the transfer, e.g., by sending a respective command or request for each report) may be used, or a combination of push and pull models may be used, in which either party may initiate the transfer. Any of various triggers may lead to the transmission of a histogram report, such as the amount of time that has elapsed since the previous histogram report was sent, the number of new metric values which have been collected since the previous histogram was sent, a determination that a particular bucket's counter is close to overflowing, and so on. The report generators 455 may assemble the histogram data in a compressed or compact form for transmission to the metrics manager in at least some embodiments. The manner in which metrics collector memory 454 is subdivided to match the local histogram configurations may differ in various embodiments (e.g., in some embodiments, buckets may be arranged in order of metric value boundaries, while in other embodiments, an index may be maintained for buckets).

Figure 5:
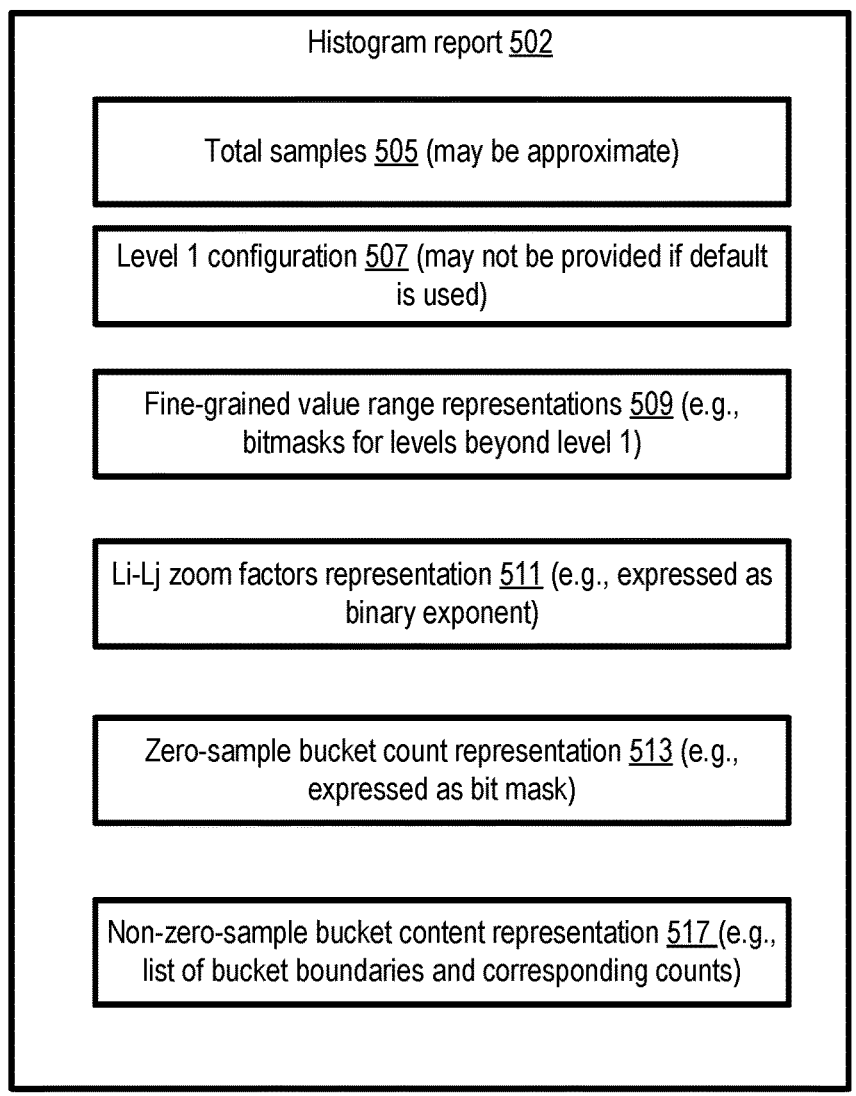
FIG. 5 illustrates example elements of a histogram report, according to at least some embodiments.

FIG. 5 illustrates example elements of a histogram report, according to at least some embodiments. Report 502 may comprise, among other elements, a total samples element 505, level one configuration information for the histogram 507, zero or more encodings or representations of fine-grained value ranges 509, zoom factor representations for various Li-Lj combinations 511, a zero-sample bucket representation 513, and a representation 517 of non-zero-sample buckets of the histogram in the depicted embodiment.

The total samples element 505 may provide an approximate count of the populations of the histogram buckets in various embodiments, which may for example be used during sanity checks operations in which the individual bucket populations (indicated in element 517) are summed at the metrics manager for comparison with the total samples element. The total samples value may be approximate rather than exact in some implementations because the bucket contents may be updated fairly rapidly as new metric values are encountered, and to avoid contention exclusive locks may be acquired on the buckets when the total samples value is being computed. Level one configuration information 507 may indicate the function (e.g., an exponential function as discussed earlier) which is used to set boundary values for level one buckets, the minimum and/or maximum values expected for the metric being collected, whether L1 buckets are to be substituted by L2 or other higher-level buckets or whether the full set of L1 buckets is retained even when higher-granularity buckets are added, and so on, in the depicted embodiment. In at least one embodiment, in which a default set of L1 buckets whose configuration details are known to the metrics manager is being used, the L1 configuration details may not be included in the histogram report 502.

For each set of higher-level buckets (e.g., L2, L3, L4, etc.), a respective descriptor may be included in representations 509. In some embodiments, a bit mask may be used to represent a given set of L1 buckets for which L2 buckets are created, a given set of L2 buckets for which L3 buckets are created, and so on. For example, consider a scenario in which by default, 16 L1 buckets with bucket boundaries arranged according to an exponential function are used, and the value range corresponding to the tenth and eleventh L1 bucket is to be split up into L2 buckets. In such a scenario, a bitmask 0000 0000 0110 0000 may be used to indicate the particular L1 buckets which are split into smaller L2 buckets. The manner in which each of the L1 buckets is split into a corresponding set of $L_{i+1}$ buckets may be indicated by zoom factor representations 511 in the depicted embodiment. In some embodiments, the range of values of a given bucket at level i may be split into a set of level (i+1) buckets whose count is a power of two (e.g., an L1 bucket may be split into 2, 4, 8, 16, L2 buckets), and the binary exponent of the expansion factor may be included in the zoom factor representation (e.g., binary exponents 1, 2, 3, or 4 may be used to represent 2-way expansion, 4-way expansion, 8-way expansion or 16-way expansion respectively).

In at least one embodiment, a significant number of buckets of a histogram may have zero samples or populations during some time intervals. A compressed representation 513 of the zero-sample buckets, such as a bit mask indicating the indices of the buckets which have zero counts or samples, may be incorporated in the histogram report 502 in some embodiments. Finally, the (possibly approximate) populations or sample counts for those buckets which have non-zero populations during the interval represented in the report may be included in element 517, e.g., as a list of entries indicating the bucket boundaries or indexes of the buckets and their sample counts. The count may be approximate for one or more buckets in some embodiments for reasons similar to those discussed above with respect to the approximate total sample count—e.g., exclusive locks on the buckets may not be acquired prior to including their sample counts in the report 502, and as a result the counts may increase while the report is being generated. It is noted that although binary arithmetic—e.g., the use of bit masks, binary shift operations, binary exponents to express zoom factors etc.—has been discussed as an example approach with respect to various embodiments, the techniques of using dynamically tunable histogram buckets may be employed in various embodiments without restricting the computations to binary operations. Thus, for example, in one embodiment, bucket boundaries which do not correspond to powers of two (or sums of powers of two) may be used at one or more levels of granularity.

Figure 6:
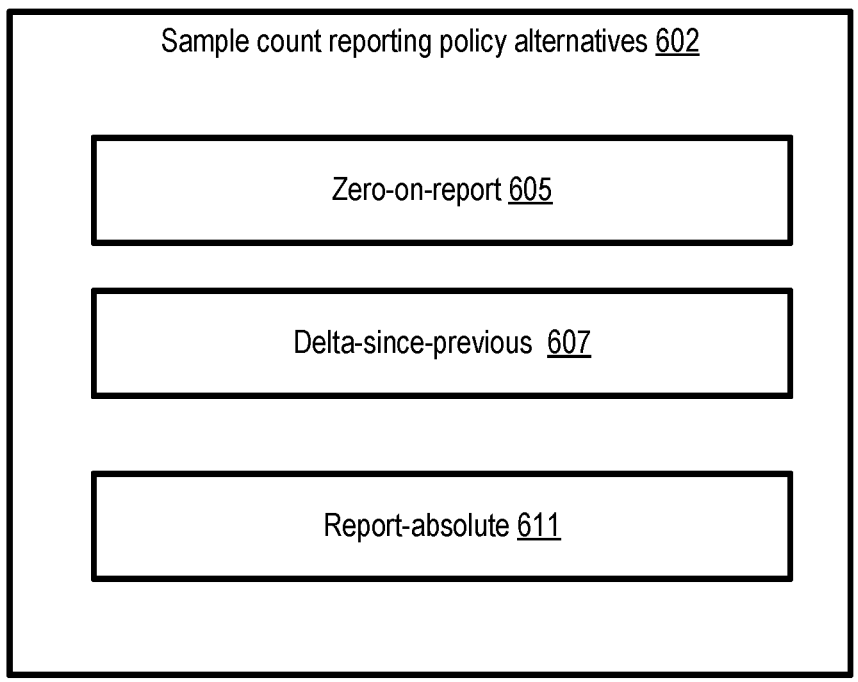
FIG. 6 illustrates examples of alternative bucket sample count reporting policies, according to at least some embodiments.

In some embodiments, the operations for which metrics are collected may be very short, and as a result metrics may be collected at a rapid pace, such as at the rate of thousands per second at some metrics collectors. As a result, it may be the case that the integers representing the sample counts may, at least in some cases, overflow, especially in memory-constrained environments. FIG. 6 illustrates examples of alternative bucket sample count reporting policies, according to at least some embodiments. As shown, the set of alternative policies 602 may comprise at least three choices in the depicted embodiment: a zero-on-report policy 605, a delta-since-previous policy 607, and a report-absolute policy 611.

According to the zero-on-report policy 605, as soon as the (non-zero) sample count of a bucket is included in a histogram report, the bucket's sample count may be reset to zero in some embodiments. According to the delta-since-previous policy 607, the sample count may not be set to zero, but only the change since the previous report was generated may be reported in various embodiments. According to the report-absolute policy 611, the values of a monotonically increasing integer counter may be reported in absolute terms rather than in delta terms, and the counter may simply be reset to zero if and when the sample count reaches a level which cannot be represented using the number of bits set aside for the integer. In at least one embodiment, the policy for reporting bucket values may be indicated to the metrics collector by a metrics manager via a programmatic interface, e.g., as part of a configuration request. According to one embodiment, integers of different widths may be used for different buckets—e.g., for a bucket with a value range for which large numbers of samples are expected, a 32-bit integer may be used, while for a bucket for which small numbers of samples are expected, a 16-bit integer may be used. Such varying bit-width settings for buckets may be selected, e.g., at a metrics manager, based on analysis of previously-collected data in some embodiments.

Examples of Metrics Collection Devices

Figure 7:
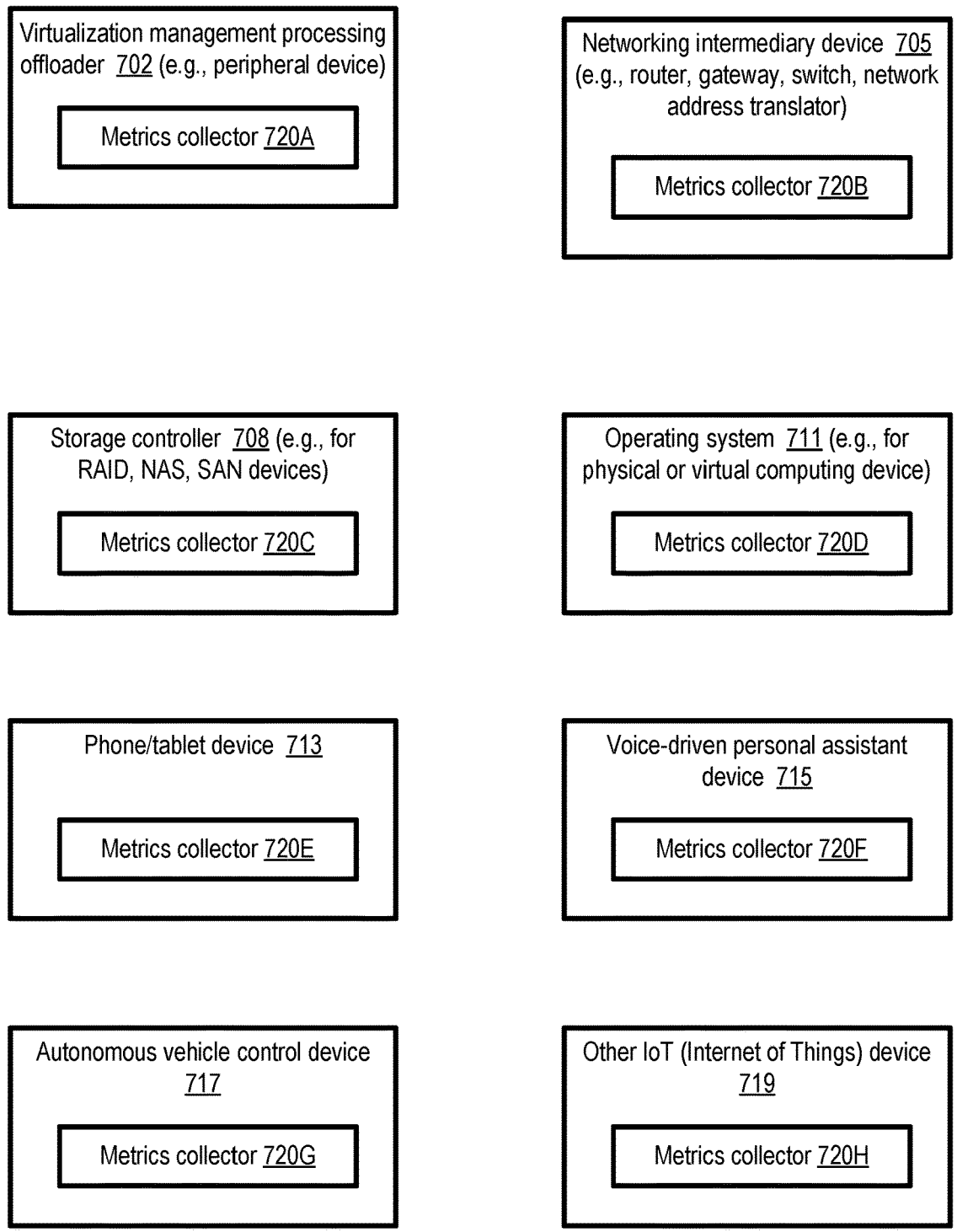
FIG. 7 illustrates examples of computing devices at which tunable histograms may be used to store metrics, according to at least some embodiments.

FIG. 7 illustrates examples of computing devices at which tunable histograms may be used to store metrics, according to at least some embodiments. In one embodiment in which metrics associated with operations (such as I/O operations to local or remote devices, web services requests, database queries and the like) performed using virtual machines are to be collected, portions of the virtualization management stack at the hosts where the virtual machines are instantiated may collect at least some of the metrics. In some embodiments, at least some of the computations associated with virtualization management may be performed at offloader devices 702, e.g., at devices connected via peripheral interfaces of the host, so as to reduce the virtualization-related overhead imposed on the main CPUs or cores of the virtualization hosts. Such virtualization management processing offloader devices 702 may comprise examples of metrics collectors 720A at which the multi-level histograms of the kinds discussed above are generated and used in some embodiments.

In some embodiments, some metrics collectors 720B may be implemented at least in part at various types of networking intermediary devices 705, such as routers, gateways, switches, network address translators and the like. According to other embodiments, one or more metrics collectors 720C may be implemented at storage controllers 708, e.g., for NAS (network attached storage), SAN (storage area network), RAID (redundant array of inexpensive disks) or other storage devices. In one embodiment, one or more metrics collectors 720D may be implemented as subcomponents of an operating system 711 for a physical or virtual machine.

Phone and/or tablet computing devices 713 may also be used to collect various types of metrics in some embodiments, and may therefore include metrics collectors 720E that utilize multi-level histograms of the kinds described herein. In various embodiments, such histograms may be incorporated within metrics collectors 720F at voice-driven personal assistant devices 715. In one embodiment, control devices 717 within autonomous vehicles may include metrics collectors 720G. In another embodiment, an IoT (Internet of things) device such as a smart refrigerator or a smart thermostat may include a metrics collector 720H at which multi-level histograms with variable-granularity buckets may be used. In at least one embodiment, a given metrics manager may configure tunable histograms at several different types of devices shown in FIG. 7, and/or collect and aggregate metrics received from the different types of devices. In various embodiments, depending on the specific types of devices at which metrics collectors are implemented, a number of different sensor-provided metrics may be collected and analyzed using tunable multi-level histograms, including for example device temperature metrics, weather-related metrics (e.g., air temperature, humidity, wind speed, precipitation and the like), or vehicle-related metrics (e.g., vehicle speed, oil pressure, tire pressure, fuel levels, and so on).

Memory Management for Dynamically Tunable Histogram Buckets

Figure 8:
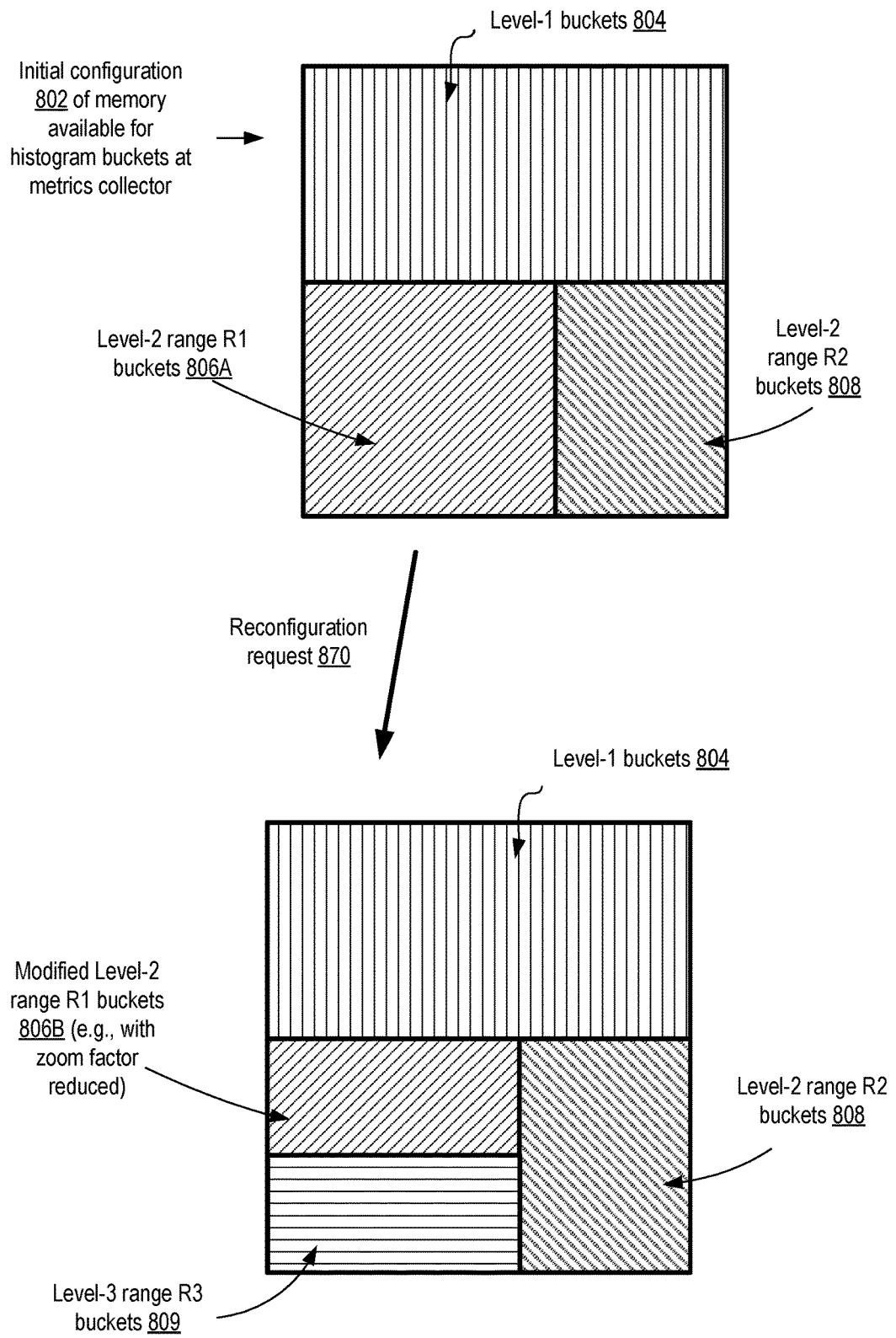
FIG. 8 illustrates an example of the distribution of memory among levels of a histogram, according to at least some embodiments.

In at least some of the devices at which tunable histograms are used, the total amount of memory available for histogram buckets may be fairly small in various embodiments. As a consequence, it may sometimes be the case that one or more existing buckets may have to be consolidated or discarded if and when new buckets are added, e.g., in response to a reconfiguration request. FIG. 8 illustrates an example of the distribution of memory among levels of a histogram, according to at least some embodiments.

In initial configuration 802 of memory available for histogram buckets at a metrics collector, three types of buckets may be set up. Region 804 of the memory may be used for Level-1 buckets, region 806A may be used for a first set of Level-2 buckets corresponding to a first metric value range R1, and region 808 may be used for a second set of Level-2 buckets corresponding to a second metric value range R2.

At some point in time, a reconfiguration request 870 may be received at the metrics collector, indicating that a set of Level-3 buckets is to be established corresponding to a specified value range R3. If, in response to receiving such a request, the metrics collector determines that there is insufficient memory to accommodate new Level-3 buckets without impacting existing buckets, some number of existing buckets may be consolidated in the depicted embodiment. For example, it may be the case that a particular set of Level-2 buckets which were previously in region 806A may be combined with adjacent buckets, resulting in modified Level-2 buckets 806B, and freeing up space 809 for the requested Level-3 buckets of range R3. In some embodiments, the reconfiguration request 870 may indicate the consolidation operations to be performed—e.g., a modified level-2 configuration may be included in the configuration request. In other embodiments, the metrics collector may itself select the set of buckets which are to be consolidated or eliminated, e.g., based on factors such as the number of samples which have been observed for the buckets in the recent past. For example, in one embodiment, if several adjacent buckets in region 806A have had zero samples over T seconds, they may be combined into a single bucket, under the assumption that few samples are expected to be obtained for the corresponding ranges in the future.

Methods for Supporting Tunable-Granularity Multi-Level Histograms

Figure 9:
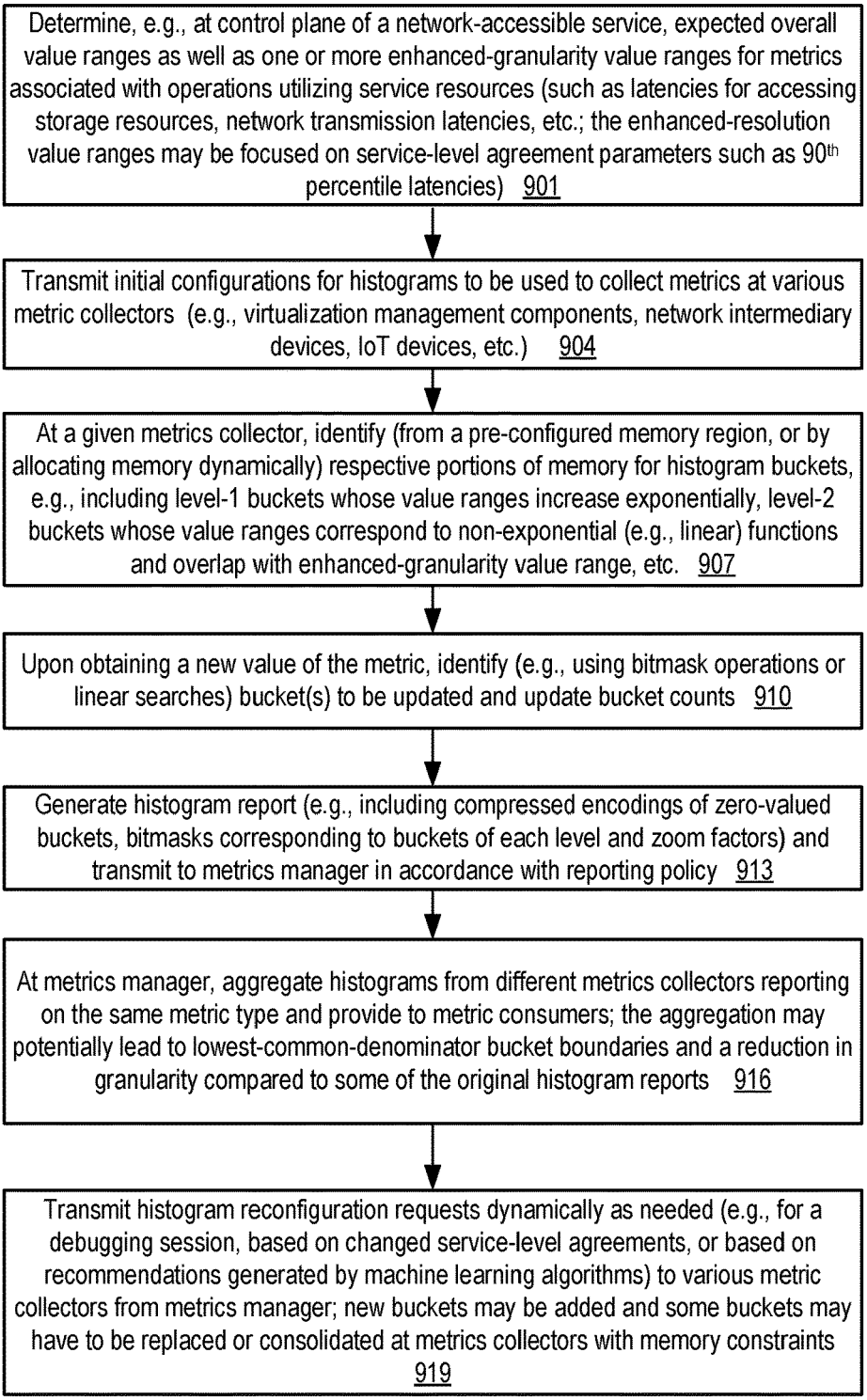
FIG. 9 is a flow diagram illustrating aspects of operations that may be performed to support multi-level tunable histograms for metrics collection, according to at least some embodiments.

FIG. 9 is a flow diagram illustrating aspects of operations that may be performed to support multi-level tunable histograms for metrics collection, according to at least some embodiments. As shown in element 901, expected value ranges as well as one or more enhanced-granularity value ranges for metrics associated with operations utilizing service resources may be determined, e.g., at control-plane components of one or more network-accessible services of a provider network. The metrics may include, for example, latencies for accessing storage resources, network transmission latencies, response times for web service requests and the like in some embodiments. The value ranges targeted for fine-grained or enhanced-resolution analysis may be focused on service-level agreement parameters such as 90th percentile latencies in some embodiments, or may be determined based at least in part on requests from clients or service administrators.

Initial configurations for histograms to be used to collect metrics at various metric collectors (e.g., collectors set up at virtualization management components, network intermediary devices such as routers, switches etc., operating systems, IoT devices, or the like) may be transmitted to the metrics collectors (element 904) in the depicted embodiment. At a given metrics collector, respective portions of memory may be allocated or identified for buckets corresponding to one or more levels of a histogram (element 907), e.g., including level-1 buckets whose value ranges are distributed exponentially so as to cover a potentially wide range of expected metric values, level-2 buckets whose value ranges correspond to non-exponential (e.g., linear) functions and overlap with enhanced-resolution value ranges, and so on. In effect, a default set of level-1 buckets intended to cover order of magnitudes of variation in metric values may be overlaid or enhanced with additional finer grained buckets to zoom in on specific value ranges of interest in various embodiments. In at least one embodiment, as mentioned earlier, a region of memory may be pre-allocated for a histogram at a metrics collector (e.g., as part of an initialization procedure of the metrics collector). Mappings between histogram buckets and respective parts of the pre-allocated region may be set up in response to configuration or re-configuration requests in such an embodiment, without requiring allocations or re-allocations of memory. In other embodiments, at least some histogram configuration or re-configuration operations may include corresponding dynamic memory allocations.

Upon obtaining a new sample or value of the metric, a metric collector may identify (e.g., using bitmask operations or linear searches) one or more bucket(s) to be updated, and update bucket population counts in the depicted embodiment (element 910). Based on reporting policies or triggering conditions, a histogram report may be generated at the metrics collector (e.g., including compressed encodings of zero-valued buckets, bitmasks indicating bucket configurations at each level and zoom factors) and transmitted to a metrics manager in various embodiments (element 913).

At the metrics manager, histograms from different metrics collectors reporting on the same metric type may be aggregated and the result of the aggregation may be provide to metric consumers (element 916) in various embodiments. In some cases the bucket boundaries of the histograms set up at different metrics collectors may not necessarily be identical; in such cases the aggregation may potentially require creating buckets with boundaries which differ from those of the original histograms received at the metrics manager. The aggregation may consequently, in some cases, result in lowest-common-denominator bucket boundaries and a reduction in granularity compared to some of the original histograms in the depicted embodiment. In one embodiment, if a reduction in granularity would result, the aggregation result may include representations of, or pointers to, the original fine-grained histograms, enabling fine-grained analysis to be performed for at least some of the metrics.

The metrics manager may transmit histogram reconfiguration requests dynamically as needed to one or more metrics collectors (e.g., for a debugging session, based on changed service-level agreements, or based on recommendations generated by machine learning algorithms) (element 919). In response to such requests, new buckets may be added and some buckets may have to be replaced or consolidated in a given histogram at metrics collectors with memory constraints in some embodiments.

It is noted that in various embodiments, some of the operations shown in FIG. 9 may be implemented in a different order than that shown in the figure, or may be performed in parallel rather than sequentially. Additionally, some of the operations shown in FIG. 9 may not be required in one or more implementations.

Use Cases

The techniques described above, of supporting dynamically configurable multi-level histograms for metrics collected at various types of devices may be useful in a variety of environments. Service level agreements for numerous categories of operations may be expressed in terms of specific performance targets in various cloud computing environments or other large-scale computing environments. Obtaining accurate statistics on the metrics associated with the performance targets may therefore be critical for the providers of the services. At the same time, values of many metrics may vary widely, sometimes over several orders of magnitude. In order to be able to capture distribution information for metrics values which vary widely, exponentially-distributed histogram bucket boundaries may be necessary. In contrast, in order to obtain fine-grained distributions, narrow histogram buckets centered on or around values of interest may be very useful. By dynamically configuring different sets of histogram buckets with bucket boundaries selected according to respective functions, the goals of capturing both the wide overall distributions of metrics, and fine grained data in value ranges of interest may be achieved simultaneously. In addition, by selecting bucket boundaries appropriately, the use of expensive and complex operations such as floating point operations may be avoided, making the multi-level histograms suitable for use at a wide variety of low-compute-power and low-memory devices such as IoT devices, phones, personal assistant devices and the like.

Illustrative Computer System

Figure 10:
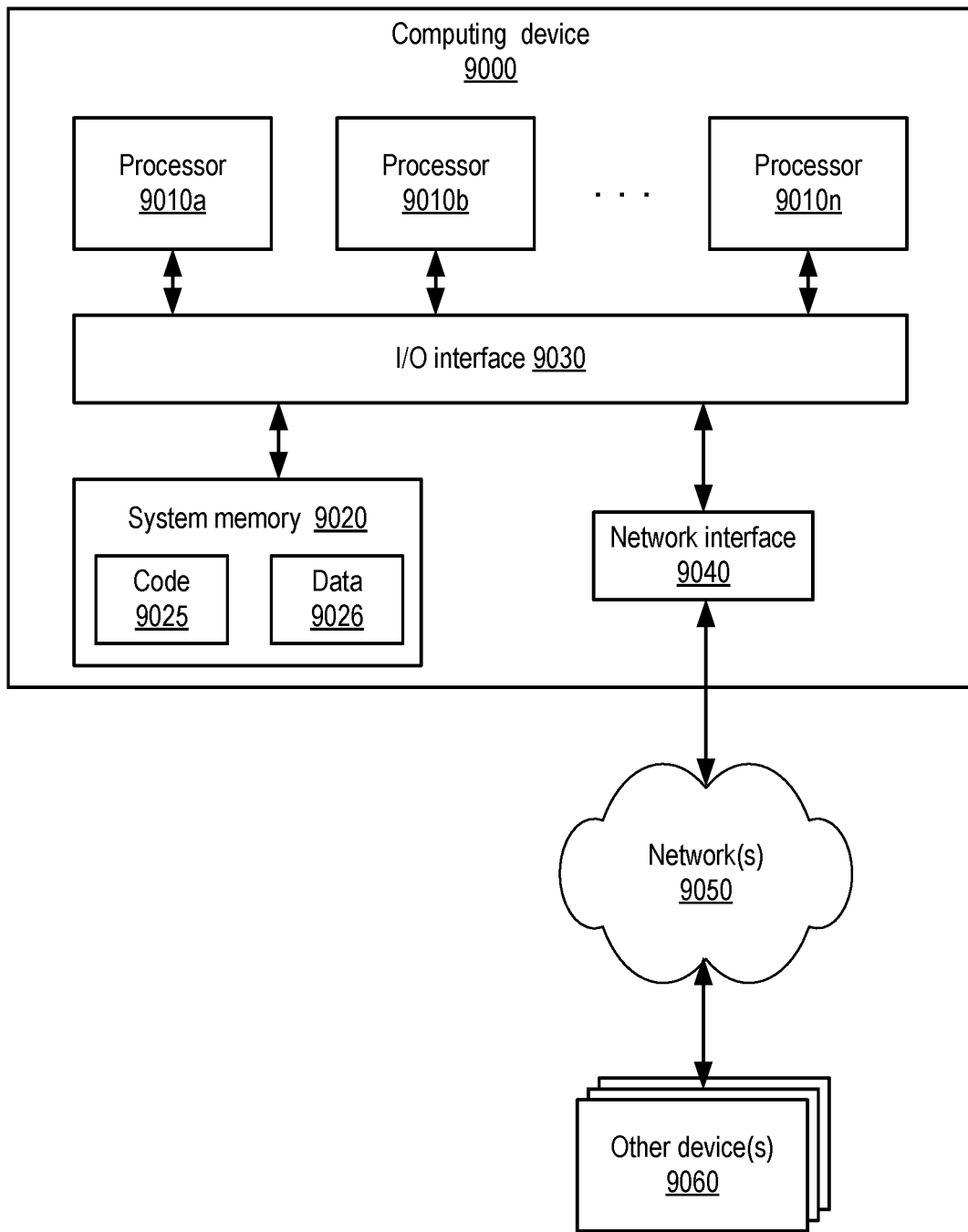
FIG. 10 is a block diagram illustrating an example computing device that may be used in at least some embodiments.

In at least some embodiments, a server that implements one or more of the techniques described above for creating and using multi-level histograms with tunable-granularity buckets may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices configured to implement one or more metrics collectors including a first metrics collector; and
   at least another computing device configured to implement a metric manager;
   wherein the first metrics collector includes instructions that upon execution on a processor cause the one or more computing devices to:
   obtain an indication of a first granularity for capturing value distribution data corresponding to one or more targeted value ranges of a first metric measuring performance of a particular network-accessible service;
   identify respective portions of memory to store data associated with (a) a plurality of first-level buckets of a first histogram of values of the first metric and (b) at least a first set of second-level buckets of the first histogram, wherein respective value ranges of at least some of the first-level buckets are distributed according to an exponential function, wherein respective value ranges of at least some of the second-level buckets of the first set are distributed according to a linear function corresponding to the first granularity, wherein the respective value ranges of the at least some of the second-level buckets of the first set that are distributed according to the linear function provide an increased resolution than the respective value ranges of the at least some of the first-level buckets that are distributed according to the exponential function, and wherein respective value ranges of at least some second-level buckets of the first set overlap at least in part with the one or more targeted value ranges;

update, in response to obtaining a first sample value of the first metric, at least one bucket of the histogram to whose value range the first sample value belongs; and transmit, to the metrics manager, a representation of at least some buckets of the histogram; and wherein the metrics manager includes instructions that upon execution on a processor cause the other computing device to provide, to one or more metrics consumers, an aggregate representation of a distribution of values of the first metric measuring the performance of the particular network-accessible service obtained from the one or more metrics collectors including the first metrics collector.

2. The system as recited in claim 1, wherein the first metrics collector includes instructions that upon execution on the processor cause the one or more computing devices to:

in response to a configuration request, wherein the configuration request comprises an indication of an additional targeted value range of the first metric, add a second set of second-level buckets to the first histogram, wherein respective value ranges of at least some second-level buckets of the second set overlap at least in part with the additional targeted value range.

3. The system as recited in claim 2, wherein the first metrics collector includes instructions that upon execution on the processor cause the one or more computing devices to:

prior to adding the second set of second-level buckets, combine or remove one or more buckets of the histogram in response to a determination that a memory threshold associated with the first histogram would be exceeded by the addition of the second set of second-level buckets.

4. The system as recited in claim 1, wherein the metrics manager includes instructions that upon execution on a processor cause the other computing device to:

determine at least one targeted value range of the one or more targeted value ranges based at least in part on a parameter of a service level agreement associated with the particular network-accessible service.

5. The system as recited in claim 1, wherein the one or more computing devices on which the first metrics collector executes comprise one or more of: (a) a virtualization management processing offloading device associated with a virtualization host of a computing service, (b) a networking intermediary, (c) a storage controller, (d) a phone, (e) a voice-controlled personal assistant device, or (f) an Internet-of-things (IoT) appliance.

6. A method, comprising:
performing, by one or more computing devices:
obtaining an indication of a first granularity for capturing value distribution data corresponding to one or more targeted value ranges of a first metric measuring performance of a particular network-accessible service;

identifying respective portions of memory to store data associated with (a) a plurality of first-level buckets of a first histogram of values of the first metric and (b) at least a first set of second-level buckets of the first histogram, wherein respective value ranges of at least some of the first-level buckets are distributed according to a first exponential function, wherein respective value ranges of at least some of the second-level buckets of the first set are distributed according to a second non-exponential function that is different from the first function, wherein the respective value ranges of the at least some of the second-level buckets of the first set that are distributed according to the second function provide an increased resolution than the respective value ranges of the at least some of the first-level buckets that are distributed according to the first function, and wherein respective value ranges of at least some second-level buckets of the first set overlap at least in part with the one or more targeted value ranges; and causing, after one or more buckets of the histogram are updated in response to obtaining values of the first metric, a representation of the one or more buckets to be transmitted to a destination.

7. The method as recited in claim 6, further comprising performing, by the one or more computing devices:

in response to receiving a configuration request, wherein the configuration request comprises an indication of another targeted value range of the first metric, adding a second set of second-level buckets to the first histogram, wherein respective value ranges of at least some second-level buckets of the second set overlap at least in part with the other targeted value range.

8. The method as recited in claim 7, further comprising performing, by the one or more computing devices:

prior to adding the second set of second-level buckets, consolidating one or more buckets of the histogram in response to determining that a memory limit associated with the first histogram would be exceeded by the addition of the second set of second-level buckets.

9. The method as recited in claim 6, further comprising performing, by the one or more computing devices:

determining at least one targeted value range of the one or more targeted value ranges based at least in part on a parameter of a service level agreement associated with the particular network-accessible service.

10. The method as recited in claim 6, wherein the destination comprises a metrics aggregator, further comprising:

receiving, at the metrics aggregator from a plurality of metrics sources, respective representations of a plurality of histograms including the first histogram and a second histogram, wherein value ranges associated with at least one bucket of the second histogram differs from value ranges of buckets of the first histogram;

generating, by the metrics aggregator, an aggregate histogram from the plurality of histograms, wherein the aggregate histogram comprises a particular bucket whose value range differs from a value range of a bucket of the first histogram; and providing, by the metrics aggregator, a representation of the aggregate histogram to a metrics consumer.

11. The method as recited in claim 6, further comprising performing, by the one or more computing devices:

applying, to a particular value of the first metric, a bit mask;

identifying, based at least in part on a result of applying the bit mask, a target bucket of the first histogram to be updated; and updating the target bucket.

12. The method as recited in claim 6, wherein at least one bucket of the first histogram has a value range which includes a negative value.

13. The method as recited in claim 6, further comprising performing, by the one or more computing devices:

sub-dividing, in response to a configuration request, a value range associated with a particular bucket of the first set of second-level buckets into a plurality of sub-ranges; and adding, to the first histogram, at least a first third-level bucket associated with a first sub-range of the plurality of sub-ranges.

14. The method as recited in claim 6, further comprising performing, by the one or more computing devices:

receiving a binary mask indicating, from among the plurality of first-level buckets, a subset of first-level buckets which are to be split into respective sets of second-level buckets; and utilizing the binary mask to determine, at least in part, a value range of at least second-level bucket of the first set of second-level buckets.

15. The method as recited in claim 6, wherein the first function is an exponential function, and wherein the second function is a function other than an exponential function.

16. A non-transitory computer-accessible storage medium storing program instructions that when executed on one or more processors cause the one or more processors to:

identify a first portion of memory to store data associated with a plurality of first-level buckets of a first histogram of values of a first metric measuring performance of a particular network-accessible service, wherein respective value ranges of at least some of the first-level buckets are distributed according to a first exponential function;

identify a second portion of memory to store data associated with at least a first set of second-level buckets of the first histogram, wherein respective value ranges of at least some of the second-level buckets of the first set are distributed according to a second non-exponential function that is different from the first function, wherein the respective value ranges of the at least some of the second-level buckets of the first set that are distributed according to the second function provide an increased resolution than the respective value ranges of the at least some of the first-level buckets that are distributed according to the first function, and wherein respective value ranges of at least some second-level buckets of the first set overlap at least in part with one or more targeted value ranges of the first metric; and cause, after one or more buckets of the histogram are updated in response to obtaining values of the first metric, a representation of the one or more buckets to be transmitted to a destination.

17. The non-transitory computer-accessible storage medium as recited in claim 16, wherein the instructions when executed on one or more processors cause the one or more processors to:

in response to receiving a configuration request, wherein the configuration request comprises an indication of another targeted value range of the first metric, add a second set of second-level buckets to the first histogram, wherein respective value ranges of at least some second-level buckets of the second set overlap at least in part with the other targeted value range.

18. The non-transitory computer-accessible storage medium as recited in claim 17, wherein the instructions when executed on one or more processors cause the one or more processors to:

prior to adding the second set of second-level buckets, replace a plurality of buckets of the histogram by a single bucket in response to determining that a memory limit associated with the first histogram would be exceeded by the addition of the second set of second-level buckets.

19. The non-transitory computer-accessible storage medium as recited in claim 16, wherein at least one targeted value range of the one or more targeted value ranges is based at least in part on a parameter of a service level agreement.

20. The non-transitory computer-accessible storage medium as recited in claim 16, wherein the first metric comprises one or more of: (a) an I/O latency, (b) a network latency (c) a response time for a type of web service request, (d) a device temperature, (e) a weather-related metric, or (f) a metric obtained at a vehicle sensor.

\* \* \* \* \*